(12) United States Patent
Chen

(10) Patent No.: US 8,911,508 B2
(45) Date of Patent: Dec. 16, 2014

(54) MODIFIER FOR POLYESTER FIBER AS WELL AS PREPARATION METHOD AND APPLICATION OF THE SAME

(75) Inventor: Jinhui Chen, Suzhou (CN)

(73) Assignee: Duplus Chemical Co., Ltd. of Zhangjiagang City, Suzhou (CN)

( * ) Notice: Subject to any disclaimer, the term of this patent is extended or adjusted under 35 U.S.C. 154(b) by 53 days.

(21) Appl. No.: 13/101,651

(22) Filed: May 5, 2011

(65) Prior Publication Data

US 2011/0265273 A1 Nov. 3, 2011

Related U.S. Application Data

(63) Continuation of application No. PCT/CN2009/000373, filed on Apr. 3, 2009.

(30) Foreign Application Priority Data

Nov. 21, 2008 (CN) .......................... 2008 1 0244319

(51) Int. Cl.
| | | |
|---|---|---|
| *D06M 15/687* | (2006.01) | |
| *D06M 15/507* | (2006.01) | |
| *D06M 13/148* | (2006.01) | |
| *D06P 3/52* | (2006.01) | |
| *C08G 63/695* | (2006.01) | |
| *C08G 63/672* | (2006.01) | |
| *C08G 77/46* | (2006.01) | |
| *D06M 13/17* | (2006.01) | |
| *D06M 15/53* | (2006.01) | |
| *D06M 15/647* | (2006.01) | |

(52) U.S. Cl.
CPC .......... *C08G 63/6956* (2013.01); *C08G 63/672* (2013.01); *C08G 77/46* (2013.01); *D06M 13/17* (2013.01); *D06M 15/53* (2013.01); *D06M 15/647* (2013.01); *D06M 2200/00* (2013.01); *D06M 2200/50* (2013.01); *Y10S 8/922* (2013.01)
USPC .............. 8/632; 8/115.54; 8/115.6; 8/115.56; 8/115.64; 8/611; 8/552; 8/922; 252/8.61; 252/8.81; 252/8.84; 252/8.91; 252/183.11

(58) Field of Classification Search
USPC ................ 252/183.11, 8.61, 8.81, 8.84, 8.91; 8/552, 611, 632, 115.54, 115.56, 8/115.64, 115.6, 922
See application file for complete search history.

(56) References Cited

U.S. PATENT DOCUMENTS

| | | | |
|---|---|---|---|
| 3,583,885 A * | 6/1971 | Preston | 428/383 |
| 4,293,611 A | 10/1981 | Martin | |
| 5,417,867 A | 5/1995 | Mikami et al. | |
| 5,939,138 A | 8/1999 | Nagahara et al. | |

FOREIGN PATENT DOCUMENTS

JP     A-2002-212297     7/2002

OTHER PUBLICATIONS

International Search Report dated Aug. 27, 2009 in International Application No. PCT/CN2009/000373 (with translation).

* cited by examiner

Primary Examiner — Amina Khan
(74) Attorney, Agent, or Firm — Oliff PLC

(57) ABSTRACT

The present invention discloses a modifier for modifying a polyester fiber as well as a preparation method and application of the same. The modifier contains ethylene glycol, two-hydroxy-end polyether, dimethyl terephthalate, two-polyether-end modified organosilicon and a metal acetate catalyst. A two-step continuous production process is adopted. The first step is esterification; that is, ethylene glycol, two-hydroxy-end polyether, dimethyl terephthalate, and two-polyether-end organosilicon are added into a reactor, and have an esterification reaction in the presence of the catalyst. In the second step, the materials produced by the esterification are transported to a polymerizer, and have a polymerization reaction under the conditions of high temperature, vacuum and catalyst, producing the high molecular weight polyester/polyether/organosilicon terpolymer with a molecular weight of 1000~50000 as the desired modifier. This modifier can be used either directly or in combination with some other substances such as surfactants, so as to modify the polyester fiber.

12 Claims, No Drawings

MODIFIER FOR POLYESTER FIBER AS WELL AS PREPARATION METHOD AND APPLICATION OF THE SAME

FIELD OF THE INVENTION

The present invention relates to a modifier for modifying the polyester fiber as well as preparation method and application of the same.

BACKGROUND OF THE INVENTION

It is well known that the polyester fiber is poor at hygroscopicity, antistatic property, decontaminating property, and bulky and soft property. The aminosilane emulsion is used as a main assistant in its after finish. However, the aminosilane emulsion can improve the polyester fiber in hand feeling rather than it's antistatic and anti-contaminating properties. Therefore, the current commercially available textile products made of the polyester fiber are poor at wearing, antistatic, and anti-contaminating properties, and may do certain harm to the human health.

SUMMARY OF THE INVENTION

A first purpose of the present invention is to provide a modifier for modifying the polyester fiber to make it healthy and comfortable.

The following technical solution is adopted in the present invention to achieve the above purpose: The modifier includes the following components based on parts by weight: 10~25 parts of ethylene glycol, 15~25 parts of dimethyl terephthalate, 1~50 parts of two-polyether-end organosilicon, 0.2~1 part of metal acetate as a catalyst, and 80~170 parts of compounds selected from one, two or more kinds of two-hydroxy-end polyethers with a molecular weight of 1000~20000 and a general formula of (I), (I) or (III);

H(OCH₂CH₂)ₘOH  (I);

H(OCH₂CH(CH₃))ₙOH  (II);

and

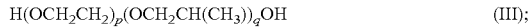

H(OCH₂CH₂)ₚ(OCH₂CH(CH₃))qOH  (III);

where m, n, p and q stand for number of the repeating unit.

A second purpose of the present invention is to provide a method of preparing the modifier as described above.

The following technical solution including the following steps is adopted in the present invention to achieve the above purpose:

1) Each of the components is weighed as required;

2) glycol and the compounds selected from one, two or more kinds of two-hydroxy-end polyethers with a general formula of (I), (II) or (III) are added into a reactor, which is then heated; the reactor is vacuum-pumped when its temperature rises to 60~80° C., making vacuum degree inside the reactor up to −0.090~−0.095 Mpa; then the reactor is heated further to 80~100° C. until the materials inside are dehydrated completely; air is introduced into the reactor, which is then heated to 100~120° C.; dimethyl terephthalate, two-polyether-end organosilicon and the catalyst are added into the reactor, which is then heated further to 150~190° C. to make the materials in the reactor completely esterificated;

3) the materials completely esterificated in the reactor are added into a polymerizer; the materials are polymerized under −0.08~−0.1 MPa vacuum degree and 200~300° C. temperature conditions with the catalyst, producing a polyester/polyether/organosilicon terpolymer with a molecular weight of 1000~50000; and then the polymerizer is cooled down to 100~160° C. to discharge the materials, producing the modifier product as required.

A third purpose of the present invention is to provide some typical applications of the modifier in modification of the polyester fiber, so as to make the modified polyester fiber possess many good properties.

1) Application as a bulking finishing agent: The bulking finishing agent contains 5~10% (weight ratio) of the modifier and the remaining of water.

2) Application as a smooth hydrophilic finishing agent: The smooth hydrophilic finishing agent contains 5~10% (weight ratio) of the modifier and the remaining of water. It can make the modified polyester fiber not only bulky and soft, but also smooth and hydrophilic.

3) Application as a durable antistatic agent: The durable antistatic agent contains 5~10% (weight ratio) of the modifier, 20~50% (weight ratio) of tertiary amine salt polymer, and the remaining of water. It can make the modified polyester fiber not only bulky and soft but also antistatic. The tertiary amine salt polymer is alkyl tertiary amine chloride or alkyl tertiary amine nitrate.

4) Application as a decontaminating finishing agent: The decontaminating finishing agent contains 5~10% (weight ratio) of the modifier, 2~5% (weight ratio) of glycerin or ethylene glycol or fluororesin, and the remaining of water. It can make the modified polyester fiber not only bulky and soft but also more decontaminating.

5) Application as a bath anti-creasing agent: The bath anti-creasing agent contains 5~10% (weight ratio) of the modifier, 0.5~3% (weight ratio) of polyacrylamide, and the remaining of water. It can make the modified polyester fiber not only bulky and soft but also anti-creasing.

6) Application as a hydrophilic anti-creasing high-temperature levelling agent: The hydrophilic anti-creasing high-temperature levelling agent contains 3~20% (weight ratio) of the modifier. It can make the modified polyester fiber not only bulky and soft but also higher in the dyeing quality.

7) Application of the modifier in the dyeing process of the polyester fiber fabric. This application has the following features: The modifier and dyes as well as other assistants (e.g. levelling agent) are added together in the dyeing process at the dyeing temperature of 60~130° C., with weight of the modifier being 0.05~5% of that of the fabric.

8) Application of the modifier in the dipping process of the polyester fiber fabric. This application has the following features: The modifier is added into the dipping liquid in the dipping process, with weight of the modifier being 0.05~5% of that of the fabric.

9) Application of the modifier in the padding process of the polyester fiber fabric. This application has the following features: The modifier is added into the padding tank in the padding process, with weight of the modifier being 0.05~5% of that of the fabric.

The relevant contents in the above technical solutions are explained as below:

1. In the above solutions, the two-polyether-end organosilicon is an organosilicon with the following general formula:

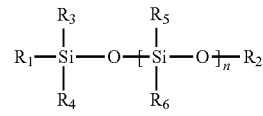

where $R_1$ and $R_2$ respectively stand for an alkoxy with 1~10 carbon atoms, and $R_3$, $R_4$, $R_5$ and $R_6$ for hydrogen, methyl, and ethyl, with the typical compounds shown as below:

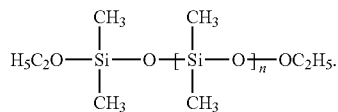

2. In the above solutions, the reactor is heated. The reactor is vacuum-pumped when its temperature rises to 60~80° C., making vacuum degree inside the reactor up to −0.090~−0.095 Mpa. Here the moisture has started to be evaporated. In order to make the moisture evaporated completely, the reactor needs to be heated further to 80~100° C. Then the discharge valve is opened to introduce air into the reactor.

3. In the above solutions, the metal acetate catalyst includes zinc acetate, calcium acetate, magnesium acetate, and potassium acetate.

The present invention has the following beneficial effects: the modifier of the present invention can modify the polyester fiber, making the modified polyester fiber good at hand feeling (bulky, soft and smooth), antistatic property, decontaminating property, and washability, thus greatly improving comfortability of the fabric made of the modified polyester fiber. Besides, the present invention further discloses that various kinds of reinforced modifiers are prepared with the modifier as the mother liquid to further improve the effect of modifying the polyester fiber, such as a reinforced bulking finishing agent, a reinforced smooth hydrophilic finishing agent and a reinforced durable antistatic agent.

DETAILED DESCRIPTION OF THE EMBODIMENTS

The present invention will further be described in detail below with reference to examples.

Example 1

1) The following materials are weighed as required: 800 g polyglycol with a molecular weight of 10000~20000 (a compound with a general formula of $H(OCH_2CH_2)_mOH$), 150 g ethylene glycol, 150 g polyether dihydric alcohol with a molecular weight of 1000~5000 (a compound with a general formula of $H(OCH_2CH(CH_3))_nOH$), 80 g two-polyether-end organosilicon. 180 g dimethyl terephthalate, and 5 g catalyst of magnesium acetate;

2) polyglycol, ethylene glycol, and polyether polyhydric alcohol are added into the reactor, which is then heated; the reactor is vacuum-pumped when its temperature rises to 75° C., making vacuum degree inside the reactor up to −0.090 Mpa; then the reactor is heated further to 90° C. until the materials inside are dehydrated completely; the reactor is heated to 102° C.; dimethyl terephthalate, two-polyether-end organosilicon and magnesium acetate are added into the reactor, which is then heated further to 150° C.; the materials in the reactor are pressed into the polymerizer after their complete esterification; the materials are polymerized under −0.095 MPa vacuum degree and 220° C. temperature conditions with magnesium acetate as the catalyst, producing the polyester/polyether/organosilicon terpolymer with a molecular weight of 1000~50000 after complete polymerization; and then the polymerizer is cooled down to 140° C. to discharge the materials, producing the product.

Example 2

1) The following materials are weighed as required: 900 g polyglycol with a molecular weight of 4000~8000 (a compound with a general formula of $H(OCH_2CH_2)_mOH$), 120 g ethylene glycol, 120 g polyether dihydric alcohol with a molecular weight of 11000~15000 (a compound with a general formula of $H(OCH_2CH(CH_3))_nOH$), 200 g two-polyether-end organosilicon, 165 g dimethyl terephthalate, and 5 g calcium acetate;

2) polyglycol, ethylene glycol, and polyether polyhydric alcohol are added into the reactor, which is then heated; the reactor is vacuum-pumped when its temperature rises to 78° C., making vacuum degree inside the reactor up to −0.093 Mpa; then the reactor is heated further to 95° C. and, after being kept at the temperature for 55 minutes, further to 104° C.; dimethyl terephthalate, two-polyether-end organosilicon and calcium acetate are added into the reactor, which is then heated further to 155° C.; the reactor is kept at this temperature for 75 minutes to make the materials in the reactor completely esterificated; then the materials esterificated in the reactor are pressed into a polymerizer; the materials are polymerized completely under −0.098 catalyst, producing the polyester/polyether/organosilicon terpolymer with a molecular weight of 5000~40000; and then the polymerizer is cooled down to 150° C. to discharge the materials, producing the product.

Example 3

1) The following materials are weighed as required: 1000 g polyglycol with a molecular weight of 1000~5000 (a compound with a general formula of $H(OCH_2CH_2)_mOH$), 100 g ethylene glycol, 100 g block polyether of ethylene glycol and propylene glycol with a molecular weight of 5000~9000 (an atactic copolymer with a general formula of $H(OCH_2CH_2)_p(OCH_2CH(CH_3))_qOH$), 150 g two-polyether-end organosilicon, 150 g dimethyl terephthalate, and 10 g zinc acetate;

2) polyglycol, ethylene glycol, and the block polyether of ethylene glycol and propylene glycol are added into the reactor, which is then heated; the reactor is vacuum-pumped when its temperature rises to 80° C., making vacuum degree inside the reactor up to −0.095 Mpa; then the reactor is heated further to 100° C. and, after being kept at the temperature for 60 minutes, further to 106° C.; dimethyl terephthalate, two-polyether-end organosilicon and zinc acetate are added into the reactor, which is then heated further to 160° C. to make the materials in the reactor completely esterificated; then the materials esterificated in the reactor are pressed into a polymerizer; the materials are polymerized completely under −0.1 MPa vacuum degree and 250° C. temperature conditions with zinc acetate as the catalyst, producing the polyester/polyether/organosilicon terpolymer with a molecular weight of 1000~50000; and then the polymerizer is cooled down to 100° C. to discharge the materials, producing the product.

The present invention adopts the two-step production process for the following two reasons:

1. In the production process, the esterification by-product is methanol, while the polymerization by-product is ethylene glycol; when the by-products (methanol and ethylene glycol) are produced and recovered in one and the same reactor system, cross contamination will occur, and distillation purification is again required. However, purity of the esterification by-product of methanol in the multiple-step process can reach over 90%, and purity of the polymerization by-product of ethylene glycol over 99%, which allow these by-products to be used as raw materials without distillation purification. Direct circular utilization can not only simplify the production process, but also follow the environmental protection trend of saving energy and decreasing consumption.

2. In the one-step production process, with the polymerization degree increasing in the polymerization process, molecular weight of the materials will increase, and so will viscosity of the materials. The motor of the reactor is usually shut down because of overload, and cannot be started again, which results in a serious quality problem.

For example, for a 3-ton esterification reactor, if viscosity of the reactants is very low, a 5 KW motor will be enough to satisfy the requirements; for a 3-ton polymerizer, with the polymerization degree increasing, molecular weight of the materials will increase, and so will viscosity of the materials, which requires a motor of over 18.5 KW to guarantee the normal production; under normal conditions, the polymerization needs higher motor power, while the esterification lower motor power, and the stirring speed has to be fast; with the multiple-step process, the production cost can then be lowered and the quality control points increased.

The polyester fiber can be modified with the modifier produced by the production process of the present invention, making the modified polyester fiber hygroscopic, bulky and soft, thus greatly improving comfortability of the fabric made of the modified polyester fiber. In addition, the present invention further discloses that various kinds of reinforced modifiers are prepared with the modifier as the mother liquid for modifying the polyester fiber, such as a reinforced bulking finishing agent, a reinforced smooth hydrophilic finishing agent and a reinforced durable antistatic agent, as shown in the following examples.

Example 4

Bulking finishing agent: 8% (mass percent concentration) bulking finishing agent is produced by adding water to the modifier obtained from Example 1, and used in the dipping process of terry after the dyeing process at a dosage of 3% (o.w.f.); then the terry is dehydrated, dried and set at 50° C.–30 min. This bulking finishing agent can make the terry product not only bulky and soft but also smooth. O.W.F. (On weight the fabric) refers to weight of the consumption relative to weight of the fabric. For example, under certain conditions, 4% (owf) dye is consumed for dyeing 100 kg shell fabric, meaning that 100×0.04=4 kg dye is needed for dyeing this amount of shell fabric.

Example 5

Bulking finishing agent: 5% (mass percent concentration) bulking finishing agent is produced by adding water to the modifier obtained from Example 2, and used in the dipping process of the terry after the dyeing process.

Example 6

Smooth hydrophilic finishing agent: 7% (mass percent concentration) smooth hydrophilic finishing agent is produced by adding water to the modifier obtained from Example 2, and used in the dipping process of plush after the dyeing process at a dosage of 4% (o.w.f); then the plush is dehydrated, dried and set at 50° C.×30 min. This smooth hydrophilic finishing agent can make the modified plush not only bulky and soft but also smooth and hydrophilic.

Example 7

Smooth hydrophilic finishing agent: 10% (mass percent concentration) smooth hydrophilic finishing agent is produced by adding water to the modifier obtained from Example 1, and used in the dipping process of the plush after the dyeing process.

Example 8

Durable antistatic agent: The smooth hydrophilic finishing agent is prepared by 8 parts of the modifier obtained from Example 2, 30 parts of WX-680A, and 62 parts of water, and used in the padding process of suede after the dyeing process at a dosage of 30 g/L, one dipping one padding (with a padding remaining rate of 70%~75%); finally the suede is dehydrated, dried, and set. This durable antistatic agent can make the modified polyester fiber not only bulky and soft but also antistatic.

Example 9

Durable antistatic agent: The smooth hydrophilic finishing agent is prepared by 5 parts of the modifier obtained from Example 3, 40 parts of WX-680A, and 55 parts of water, and used in the padding process of the suede after the dyeing process.

Example 10

Decontaminating finishing agent: The decontaminating finishing agent is prepared by 10 parts of the modifier obtained from Example 1, 1 part of glycerin, and 89 parts of water, and used in the padding process of knitting cloth after the dyeing process at a dosage of 30 g/L, one dipping one padding (with a padding remaining rate of 70%~75%); finally the knitting cloth is dehydrated, dried, and set. The decontaminating finishing agent can make the modified polyester fiber not only bulky and soft but also more decontaminating.

Example 11

Decontaminating finishing agent: The decontaminating finishing agent is prepared by 6 parts of the modifier obtained from Example 3, 3 part of glycerin, and 91 parts of water, and used in the padding process of the knitting cloth after the dyeing process.

Example 12

Bath anti-creasing agent: The bath anti-creasing agent is prepared by 8 parts of the modifier obtained from Example 2, 1 part of polyacrylamide, and 91 parts of water, and used in the dyeing-bathing blend in one step process of the terry at a dosage of 4% (o.w.f); then the terry is dyed, reducingly cleaned, dehydrated, dried, and set; that is, the modifier can be used together with polyacrylamide in one solution in a high-temperature/high-pressure dyeing machine, making the terry not only bulky and soft and anti-creasing but also improved in preventing the stiff hand feeling of polyacrylamide during usage.

Example 13

Bath anti-creasing agent: The bath anti-creasing agent is prepared by 9 parts of the modifier obtained from Example 1, 0.5 part of polyacrylamide, and 90.5 parts of water, and used in the dyeing-bathing blend in one step process of the terry.

Example 14

Hydrophilic anti-creasing high-temperature levelling agent: 10%/(mass percent concentration) hydrophilic anti-creasing high-temperature levelling agent is produced by adding water to the modifier obtained from Example 1, and used in the dyeing-bathing blend in one step process of the terry at a dosage of 4% (o.w.f); then the terry is dyed, reducingly cleaned, dehydrated, dried, and set; this hydrophilic anti-creasing high-temperature levelling agent can make the modified polyester fiber not only bulky and soft but also higher in the dyeing quality, making the dyed fabric more even and bright in color.

Example 15

Hydrophilic anti-creasing high-temperature levelling agent: 20% (mass percent concentration) hydrophilic anti-creasing high-temperature levelling agent is produced by adding water to the modifier obtained from Example 2, and used in the dyeing-bathing blend in one step process of the terry.

Example 16

The polyester fiber modifier obtained from Example 1, the disperse dye red of C.I. Disperse Red 60 (60756), and the levelling agent of 600# sulfonation are added together in the dyeing process at the dyeing temperature of 120° C., with weight of the modifier being 0.3% of that of the fabric.

Example 17

The polyester fiber modifier obtained from Example 3, the disperse dye red of C.I. Disperse Blue 20, and the levelling agent of 600# sulfonation are added together in the dyeing process, with weight of the modifier being 4% of that of the fabric.

Example 18

The modifier obtained from Example 1 is applied in the dipping process of the polyester fiber fabric. This application is characterized in that the modifier is added into the dipping liquid in the dipping process, with weight of the modifier being 4% of that of the fabric.

Example 19

The modifier obtained from Example 3 is applied in the dipping process of the polyester fiber fabric. This application is characterized in that the modifier is added into the dipping liquid in the dipping process, with weight of the modifier being 0.4% of that of the fabric.

Example 20

The modifier obtained from Example 2 is applied in the padding process of polyester fiber fabric. This application is characterized in that the modifier is added into the padding tank in the padding process, with weight of the modifier being 3.5% of that of the fabric.

Example 21

The modifier obtained from Example 3 is applied in the padding process of polyester fiber fabric. This application is characterized in that the modifier is added into the padding tank in the padding process, with weight of the modifier being 0.05% of that of the fabric.

What is claimed is:

1. A modifier for polyester fiber, comprising the following components based on parts by weight:
   10-25 parts of ethylene glycol;
   15-25 parts of dimethyl terephthalate;
   1-50 parts of organosilicon having a general formula:

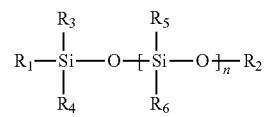

where
   $R_1$ and $R_2$ respectively stand for an alkoxy with 1-10 carbon atoms,
   $R_3$, $R_4$, $R_5$ and $R_6$ for hydrogen, methyl, and ethyl, and
   n stands for a number of repeating units and is of a value such that the molecular weight of a polyester/polyether/organosilicon terpolymer of the modifier is in a range of 1000-5000 dalton;
   0.2-1 parts of metal acetate with a molecular weight of 1000-20000 dalton as a catalyst; and
   80-170 parts of compounds selected from one, two or more kinds of two-hydroxy-end polyethers with a general formula of (I), (II) or (III):

$$H(OCH_2CH_2)_mOH \qquad (I),$$

where m stands for a number of repeating units and has a value such that the molecular weight of the two-hydroxy-end polyether with the general formula of (I) is from 10000 to 20000 dalton;

$$H(OCH_2CH(CH_3))_zOH \qquad (II),$$

where z stands for a number of repeating units and has a value such that the molecular weight of the two-hydroxy-end polyether with the general formula of (II) is from 1000 to 5000 dalton; or $$H(OCH_2CH_2)_p(OCH_2CH(CH_3))_qOH \qquad (III),$$

where p and q stand for a number of repeating units and have values such that the molecular weight of the two-hydroxy-end polyether with the general formula of (HI) is from 5000 to 9000 dalton.

2. A method of preparing the modifier for polyester fiber according to claim 1, comprising:
   1) weighing each of the components as required;
   2) adding the ethylene glycol and the compounds selected from one, two or more kinds of two-hydroxy-end polyethers with a general formula of (I), (II) or (III) into a reactor, heating the reactor and, when its temperature rises to 60-80° C., vacuum pumping the reactor so that a vacuum degree inside of the reactor is up to −0.090 to −0.095 Mpa, heating the reactor further to 80-100° C. until the materials inside are dehydrated completely, introducing air into the reactor, which is then heated to 100-120° C., and adding the dimethyl terephthalate, the organosilicon and the catalyst into the reactor, which is then heated further to 150-190° C. to make the materials in the reactor completely esterificated; and
   3) adding the materials that are completely esterificated in the reactor into a polymerizer, polymerizing the materials under −0.08 to −0.1 MPa vacuum degree and 200-300° C. temperature conditions with the catalyst, producing a polyester/polyether/organosilicon terpolymer with a molecular weight of 1000-20000 dalton, and then cooling down the polymerizer to 100-160° C. to discharge the materials, thereby producing the modifier.

3. A bulking finishing agent comprising the modifier according to claim 1, wherein the bulking finishing agent contains 5-10% in weight ratio of the modifier and the remainder of water.

4. A smooth hydrophilic finishing agent comprising the modifier according to claim 1, wherein the smooth hydrophilic finishing agent contains 5-10% in weight ratio of the modifier and the remainder of water.

5. A durable antistatic agent comprising the modifier according to claim 1, wherein the durable antistatic agent contains 5-10% in weight ratio of the modifier, 20-50% in weight ratio of quaternary amine salt polymer, and the remainder of water.

6. The durable antistatic agent according to claim 5, wherein the quaternary amine salt polymer is alkyl tertiary amine chloride or alkyl tertiary amine nitrate.

7. A decontaminating finishing agent comprising the modifier according to claim 1, wherein the decontaminating finishing agent contains 5-10% in weight ratio of the modifier, 2-5% in weight ratio of glycerin, ethylene glycol or fluororesin, and the remainder of water.

8. A bath anti-creasing agent comprising the modifier according to claim 1, wherein the bath anti-creasing agent contains 5-10% in weight ratio of the modifier, 0.5-3% in weight ratio of polyacrylamide, and the remainder of water.

9. A hydrophilic anti-creasing high-temperature levelling agent comprising the modifier according to claim 1 in a weight ratio of 3-20%.

10. A dyeing process of polyester fiber fabric, comprising adding together the modifier according to claim 1 and dyes, as well as other assistants, at a dyeing temperature of 60-130, with a weight of the modifier being 0.05-5% of that of the fabric.

11. A dipping process of polyester fiber fabric, comprising adding the modifier according to claim 1 into a dipping liquid in the dipping process, with a weight of the modifier being 0.05-5% of that of the fabric.

12. A padding process of polyester fiber fabric, comprising adding the modifier according to claim 1 into a padding tank in the padding process, with a weight of the modifier being 0.05-5% of that of the fabric.

* * * * *